United States Patent [19]

Yamamoto et al.

[11] Patent Number: 5,452,022
[45] Date of Patent: Sep. 19, 1995

[54] IMAGE SIGNAL STORAGE DEVICE FOR A STILL VIDEO APPARATUS

[75] Inventors: Yasuhiro Yamamoto; Koichi Sato, both of Tokyo, Japan

[73] Assignee: Asahi Kogaku Kogyo Kabushiki Kaisha, Tokyo, Japan

[21] Appl. No.: 237,208

[22] Filed: May 3, 1994

[30] Foreign Application Priority Data

May 7, 1993 [JP] Japan ................. 5-131108

[51] Int. Cl.⁶ ............................................ H04N 5/904
[52] U.S. Cl. ...................... 348/714; 348/231; 348/18; 348/572; 348/559
[58] Field of Search ............ 348/231, 439, 22, 23, 348/18, 559, 909, 714–719, 572; H04N 5/907

[56] References Cited

U.S. PATENT DOCUMENTS

| | | | |
|---|---|---|---|
| 5,012,328 | 4/1991 | Ishiguro | 348/714 |
| 5,153,740 | 10/1992 | Sato | 358/310 |
| 5,251,027 | 10/1993 | LaBeau | 348/22 |
| 5,287,226 | 2/1994 | Sato et al. | 360/35.7 |
| 5,317,455 | 5/1994 | Kozuki et al. | 348/18 |

*Primary Examiner*—James J. Groody
*Assistant Examiner*—Glenton B. Burgess
*Attorney, Agent, or Firm*—Sandler, Greenblum & Bernstein

[57] ABSTRACT

An image signal inputting and outputting apparatus has a memory device for temporarily storing image signals. In addition, the image signal inputting and outputting apparatus includes an A/D converter for converting analog image signals to digital image signals. The apparatus further includes a memory controller for writing the digital image signals into the memory device and reading out the image signals written in the memory device, and a controller for enabling the A/D converter to hold blanking level data converted by the A/D converter after the A/D converter converts effective signals of the image signals.

17 Claims, 4 Drawing Sheets

IMAGE SIGNAL STORAGE DEVICE FOR A STILL VIDEO APPARATUS

BACKGROUND OF THE INVENTION

1. Field of the Invention

The present invention relates to an image signal inputting and outputting apparatus in which an image signal, which may be recorded on or read from a recording medium such as a magnetic disc, is stored in a memory, and converted to a signal having a predetermined format.

2. Description of Related Art

In a still video apparatus (e.g., still video camera) it is necessary to rotate a recording medium in the form of a disc (e.g., magnetic disc, optical disc, or optical-magnetic disc) at a constant speed in order to reproduce image signals recorded on the recording medium. Moreover, in the case that a magnetic disc is the recording medium, a magnetic head must be kept in sliding contact with the same recording track in the case that an optical disc is the recording medium, an optical head must continually seek the recording track of the optical disc. Consequently, it is possible that the magnetic head or the optical head might be damaged.

To reproduce a still picture which has been recorded on the recording disc as image signals, analog signals for one picture plane are read from the recording disc, and are converted to digital signals by an A/D converter. Then, the digital picture signals are stored in a semiconductor memory (RAN). Thereafter, the digital picture signals are read from the semiconductor memory and converted to analog signals by a D/A converter and outputted in a predetermined format. During this operation, neither the rotation of the magnetic disc nor the seeking operation of the head occurs.

Consequently, it is necessary to add synchronizing signals and horizontal and vertical blanking signals to the picture signals when the digital picture signals are read from the semiconductor memory for recording or reproducing the picture signals stored therein.

FIG. 4 shows a known circuitry for adding the horizontal and vertical blanking signals to the picture signals inputted from an image sensor or the like. As can be seen in FIG. 4, the inputted picture signals are converted to digital signals by an A/D converter 52. Thereafter, the picture signals for one digital plane (i.e., one frame or one field) are written in a semiconductor memory 53. The digital picture signals written in the semiconductor memory 53 are successively read therefrom and inputted to a D/A converter 54 through AND circuits 40 (1), 40(2) . . . , 40(n). Thereafter, the analog picture signals outputted from the D/A converter 54 are outputted to the magnetic disc apparatus or similar recording medium.

The AND circuits 40(1), 40(2) . . . , 40(n) are provided for the respective data bits to provide a retrace interval to the digital picture data read from the semiconductor memory 53 and to prevent unnecessary data from being inputted to the D/A converter 31 upon setting the blanking signals and blanking level.

If the AND circuits 40(1), 40(2) . . . , 40(n), which provide the retrace interval were dispensed with, the still video apparatus as a whole would be simplified and miniaturized.

SUMMARY OF THE INVENTION

It is an object of the present invention to provide a simple image signal inputting and outputting apparatus for a still video apparatus, in which no circuit for generating the blanking level in the blanking time is necessary, thus resulting in a realization of a compact still video apparatus.

To achieve the object mentioned above, according to the present invention, there is provided an image signal inputting and outputting apparatus having a memory device for temporarily storing image signals, including an A/D converter for converting analog image signals to digital image signals. The apparatus further includes a memory controller for writing the digital image signals into the memory device and reading out the digital image signals written in the memory device, and a controller for enabling the buffer memory of the A/D converter to hold blanking level data converted by the A/D converter after the A/D converter converts effective signals of the image signals.

Preferably, a D/A converter means, for converting the digital image signals read out from the memory means and the digital blanking level data read out from the buffer memory of the A/D converter means, is provided.

The present disclosure relates to subject matter contained in Japanese patent application No. 05-131108 (filed on May 7, 1993) which is expressly incorporated herein by reference in its entirety.

BRIEF DESCRIPTION OF THE DRAWINGS

The present invention will be described below in detail with reference to the accompanying drawings, in which.

DESCRIPTION OF THE PREFERRED EMBODIMENT

Figure 1:
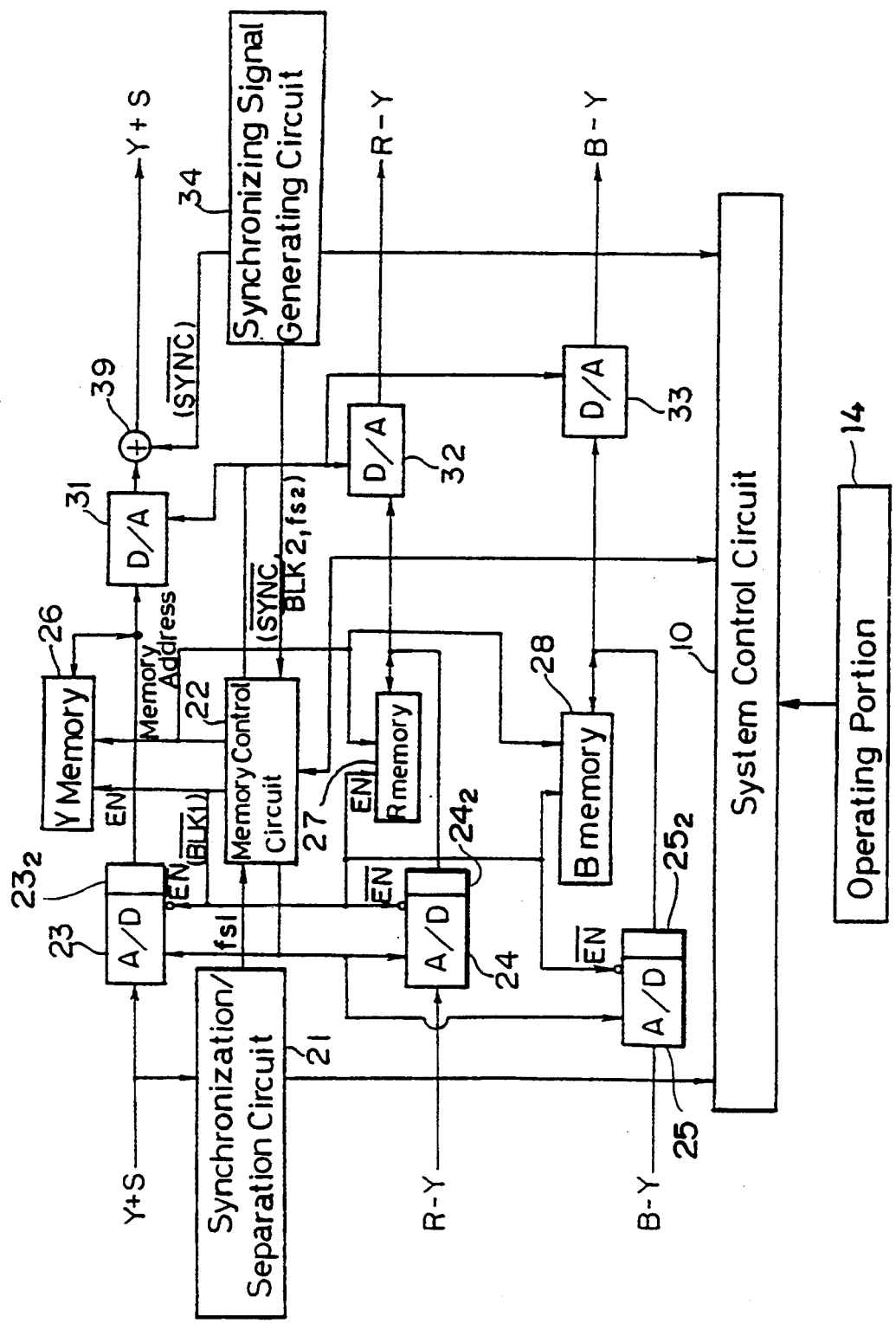
FIG. 1 is a block diagram of an image signal inputting and outputting apparatus according to the present invention.

In FIG. 1, a system control circuit 10 is in the form of a microcomputer having a ROM in which a predetermined program is stored. System control circuit 10 generally controls the entire operation of the image signal inputting and outputting apparatus and necessary operations. An operating portion 14, which is actuated by an operator is connected to the system controller 10, so that the latter carries out the inputting and outputting operations (referred to hereinafter as I/O operations) in response to the command signals inputted from the operating portion 14.

A luminance signal Y+S and color difference signals R−Y and B−Y, which are obtained by decoding, for example, an NTSC system of TV signals are inputted to the image signals I/O apparatus through an external I/O terminals (not shown) or the like. The luminance signal Y+S is inputted to an A/D converter 23 and a synchronizing signal separating and pulse generating circuit 21. The color difference signals R−Y and B−Y are inputted to A/D converters 24 and 25, respectively.

The A/D converter 23 samples the luminance signal Y+S, and converts same to the digital luminance signal Y, which is inputted to a Y memory 26 and a D/A converter 31. Similarly, the color difference signal R−Y is converted to the digital signal by the A/D converter 24, and is inputted to an R memory 27 and a D/A converter 32. The color difference signal B−Y is converted to the digital signal by the A/D converter 25, and is inputted to a B memory 28 and a D/A converter 33.

The synchronizing signal separating/pulse generating circuit 21 separates the synchronizing signal S from the inputted luminance signal Y+S, and generates a clock signal fs1, which is synchronous with the synchronizing signal S, to input the same into the memory control circuit 22 and the system control circuit 10. The memory control circuit 22 generates a sampling clock signal and a memory address signal in accordance with the clock signal fs1.

The sampling clock signal is inputted to the A/D converters 23, 24 and 25, so that the memory address signal generated by the memory control circuit 22 is inputted to the Y memory 26, the R memory 27, and the B memory 28. The blanking signal $\overline{BLK1}$ (i.e., negative logical signal), inputted to the output enable terminals $\overline{EN}$ (i.e., negative logical signal input terminals) of the A/D converters 23, 24 and 25, and is also inputted to the output enable terminals EN (i.e., positive logical signal input terminals) of the Y memory 26, the R memory 27, and the B memory 28.

Figure 2:
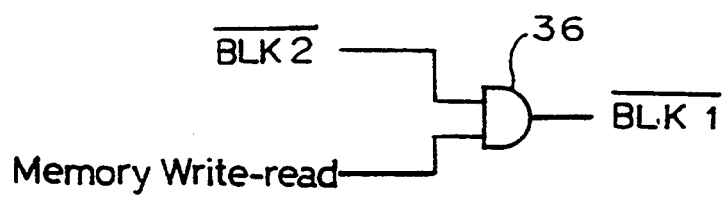
FIG. 2 is a logical circuit for producing blanking signals $\overline{BLK1}$ according to the present invention.

FIG. 2 shows a logical circuit for producing the blanking signals $\overline{BLK1}$ in the memory control circuit 22. In FIG. 2 a negative logical sum of the blanking signal $\overline{BLK2}$ (i.e., negative logical signal) inputted from the synchronizing signal generator 34, and the read/write switching signal of the memory inputted from the system control circuit 10 is obtained by the AND circuit 36, the output of the AND circuit 36 is outputted to the A/D converters 23, 24 and 25. and the memories 26, 27 and 28, as blanking signals $\overline{BLK1}$.

The level of the blanking signal $\overline{BLK1}$ becomes low "L" when the picture signals inputted to the picture signal inputting and outputting apparatus of the present invention are converted to digital signals to write the same into the memories 26, 27 and 28, and when the blanking level in the blanking time is applied to the new format of picture signals. In the period of time in which data is read from the memories 26 27 and 28 the blanking signal $\overline{BLK1}$ has a logical value of high level "H" identical to that of the blanking signal $\overline{BLK2}$.

Data read from the Y memory 26 is inputted to the D/A converter 31, converted to analog data, and then inputted to an adder 39. Similarly, the digital data read from the R memory 27 and the B memory 28 are converted to analog data by the D/A converters 32 and 33, and then outputted to the magnetic disc apparatus or a display, etc. (not shown).

The data output terminals of the A/D converters 23, 24 and 25 and the data input and output terminals of the memories 26, 27 and 28 are provided for inputting and/or outputting three-state signals, and are connected to local buses. Namely, when the level of the blanking signal $\overline{BLK1}$ inputted to the output enable terminals of the A/D converters 23, 24 and 25 is not low, the data output terminals of the A/D converters 23, 24 and 25 have a high impedance. Similarly, when no blanking signal $\overline{BLK1}$ of high level is inputted to the output enable terminals of the memories 26, 27 and 28, the data input/output terminals are in a high impedance state.

The output enable terminals of the memories 26, 27 and 28 are positive logical signal input terminals, and the output enable terminals of the A/D converters 23, 24 and 25 are negative logical signal input terminals, respectively. Consequently, the data output terminals of one of the devices become active in accordance with the blanking signal $\overline{BLK1}$ inputted from the memory control circuit 22.

The synchronizing signal $\overline{SYNC}$ (i.e., negative logical signal), newly generated by the synchronizing signal generating circuit 34, is added to the digital luminance signal Y inputted to the adder 39, to be outputted to an external device (not shown).

The synchronizing signal generating circuit 34 produces the blanking signals $\overline{BLK2}$ the clock signal fs2, and the synchronizing signal $\overline{SYNC}$. The synchronizing signal generating circuit 34 outputs the synchgronizing signal $\overline{SYNC}$ to the memory control circuit 22. The memory control circuit 22 outputs the blanking signal $\overline{BLK2}$ of the logical value identical to that of the blanking signal $\overline{BLK1}$ to the A/D converters 23, 24 and 25 and the Y, R and B memories 26, 27 and 28. The blanking signal $\overline{BLK2}$ is generated based on the clock signal fs2 and the synchronizing signal $\overline{SYNC}$.

The memory control circuit 22 generates a D/A converting clock signal fs based on the clock signal fs2 and outputs the same to the D/A converters 31, 32 and 33. Also, the memory control circuit 22 generates data reading address data and outputs the same to the Y, R and B memories 26, 27 and 28.

Figure 3:
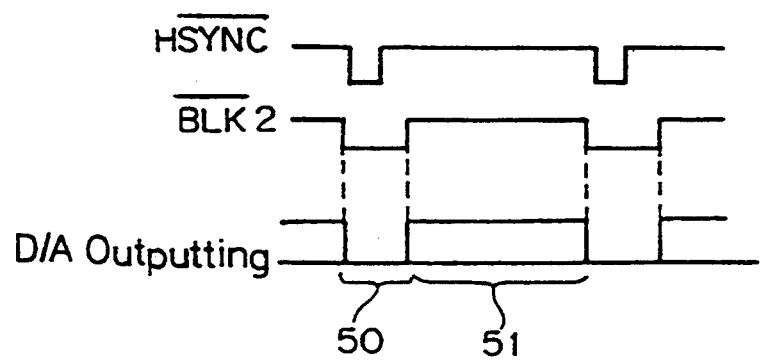
FIG. 3 is a diagram of image signals generated in the present invention.
Figure 4:
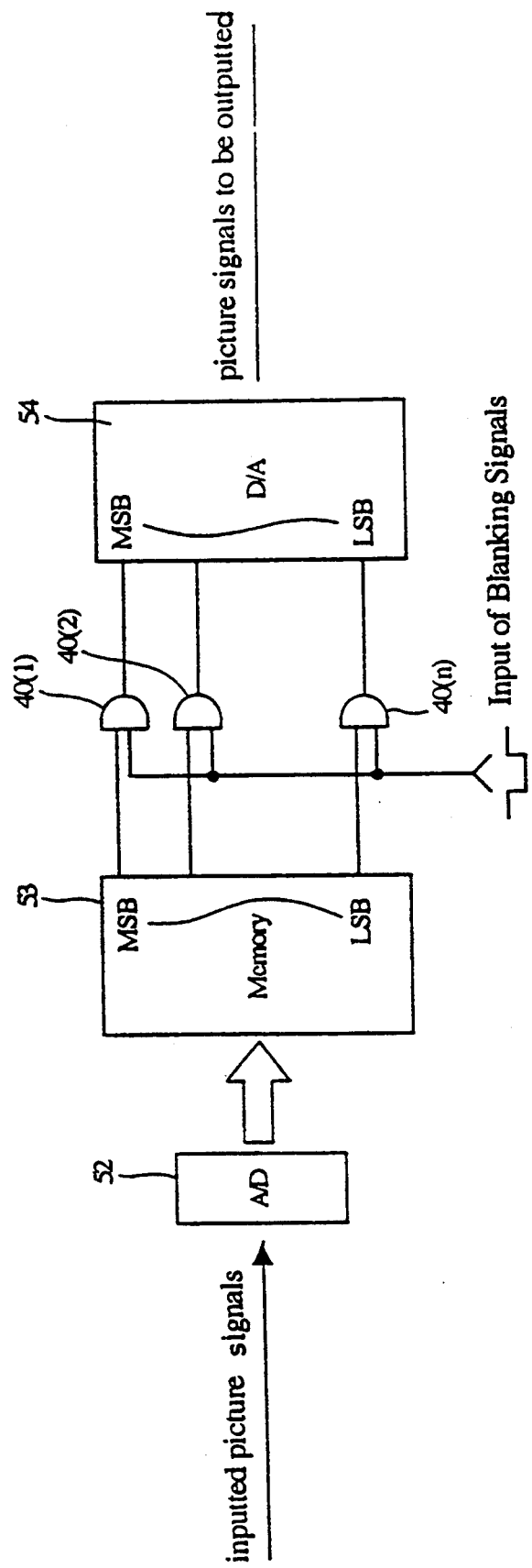
FIG. 4 is a block diagram of a known image signal inputting and outputting apparatus.

The image signal inputting and outputting apparatus as constructed above operates as follows (see FIG. 3).

The synchronizing signal S is separated or extracted from the luminance signal Y+S, inputted to the image signal inputting and outputting apparatus, by the synchronizing signal separating/pulse generating circuit 21. The signal separating pulse generating circuit 21 generates the clock signals fs1 whose phase is identical to that of the synchronizing signal S. The clock signals fs1 is used by the memory control circuit 22 to generate the sampling clock signal for sampling the luminance signal Y, the color difference signals R−Y and B−Y corresponding to each picture element. The clock signals fs1 is also used to generate the address data of the memories 26, 27 and 28. The address data is counted up in synchronization with the clock signal fs1.

The memory control circuit 22 outputs the sampling clock signal to the A/D converters 23, 24 and 25. The A/D converters 23, 24 and 25 sample and convert the luminance signal Y and the color difference signals R−Y and B−Y, in accordance with the sampling clock signal inputted from the memory control circuit 22. The memory control circuit 22 writes the luminance signal Y and the color difference signals R−Y and B−Y, converted to the digital data by the A/D convertors 23, 24 and 25 into the Y memory 26, the R memory 27 and B memory 28, respectively.

The memory control circuit 22 also generates the address data of the Y memory 26, the R memory 27 and B memory 28, at which the digital data is to be written.

Figure 5:
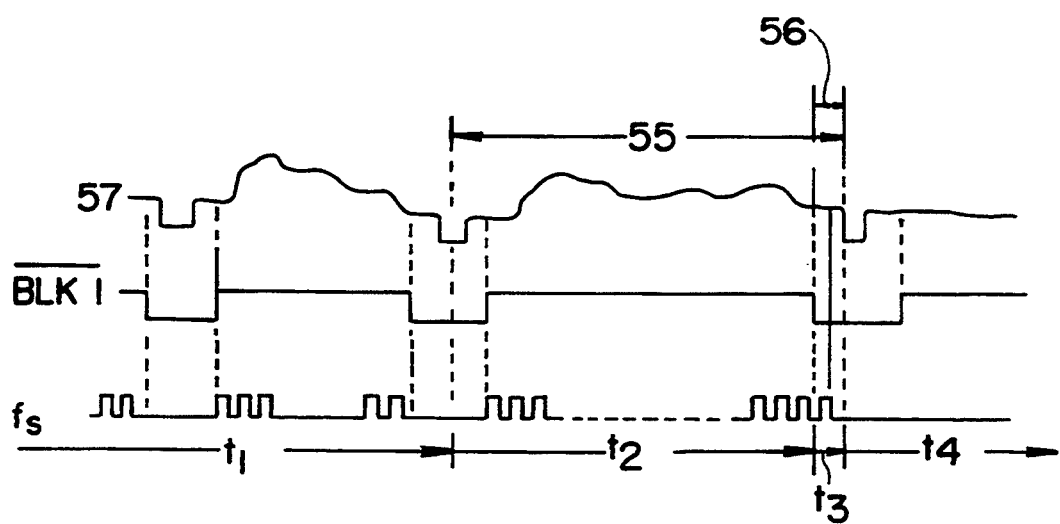
FIG. 5 is a timing diagram showing the an A/D clock signal, a blanking signal, and an active video signal.

Referencing FIGS. 1 and 5, the time period $t_2$, at which the writing operation of the picture signals for one picture plane 55 is completed, is detected in accordance with the address data. During time period $t_3$, the memory control circuit 22 outputs one pulse of sampling clock fs to each of the A/D converters 23, 24 and 25, so that one conversion of the blanking level of signals, outputted immediately after the completion of the A/D conversion of all the effective picture signals by the A/D converters 23, 24 and 25, takes place. Namely, the memory control circuit 22 causes the A/D converters 23, 24 and 25 to convert the blanking level of picture signals 57 for one picture element in the blanking time, contained in the end portion (terminal portion) 56 of the luminance signal Y and the color difference signals R−Y and B−Y for one picture plane (one frame or one field).

The A/D converters 23, 24 and 25 convert the blanking level of signals contained in the end portion 56 of the picture signals 57 for one picture plane 55 in accordance with the A/D command signal for one pulse. The converted signals are stored in a buffer memory (or a cache memory) 23a, 24a, 25a. During time period $t_4$, no sampling clock signal is inputted to the A/D converters 23, 24 and 25 after the A/D conversion of the blanking level of signals is completed. Accordingly, the A/D converters 23, 24 and 25 hold the blanking level of digital data and outputting the same while blanking signal $\overline{BLK1}$ is low level. Thereafter, the operation of the A/D converters 23, 24 and 25 is stopped.

Regarding the digital luminance signal Y and the digital color difference signals R−Y and B−Y converted by the A/D converters 23, 24 and 25, data necessary for the effective picture elements of each horizontal scanning line is successively written in the Y memory 26, the R memory 27 and the B memory 28. It is not necessary to write the blanking level of the inputted picture signals or data in the blanking time in the Y memory 26, the R memory 27 and the B memory 28.

When the storage of the data for one picture plane in the Y memory 26, the R memory 27 and the B memory 28 is completed, the memory control circuit 22 outputs the data storage completion signal to the system control circuit 10. The system control circuit 10 outputs a data reading command signal to the memory control circuit 22 to read the stored data from the respective memories 26, 27 and 28 in response to the data storage completion signal to thereby record the read data, for example, on the magnetic disc.

The memory control circuit 22 generates the reading address data of the memories 26, 27 and 28 in synchronization with the clock signal fs2 outputted from the synchronizing signal generating circuit 34, in response to the data reading command signal. Consequently, the luminance signal Y and the color difference signals R−Y and B−Y corresponding to each picture element are simultaneously read from the respective memories 26, 27 and 28.

Data read from the memories 26, 27 and 28 is converted to analog data by the D/A converters 31, 32 and 33, and is then outputted to a magnetic disc apparatus or a display (not shown), etc.

For the blanking level in the blanking time, to be applied to the luminance signal Y and the color difference signals R−Y and B−Y read from the respective memories 26, 27 and 28, data stored in the A/D converters 23, 24 and 25 are used. Namely, during the horizontal and vertical retrace intervals of the picture signals to be outputted to an external apparatus, the reading-out operation of data from the memories 26, 27 and 28 is temporarily suspended. Instead data is read from the A/D converters 23, 24 and 25. This is controlled in accordance with the blanking signal $\overline{BLK1}$, as mentioned above. The blanking signal $\overline{BLK2}$ outputted from the synchronizing signal generating circuit 34 is directly outputted to the output enable terminals of the A/D converters 23, 24 and 25 and the output enable terminals of the memories 26, 27 and 28, so that the blanking level of digital signals converted by the A/D converters 23, 24 and 25 is outputted to the D/A converters 31, 32 and 33 during the blanking of the retrace lines.

The blanking level data stored in the A/D converters 23, 24 and 25 is converted by the D/A converters in the retrace interval. In the effective time of picture images, the digital data of the Y memory 26, the R memory 27 and the B memory 28 is converted to the analog data to obtain a desired format of picture signals, as can be seen in FIG. 3. In FIG. 3, the blanking level data stored in the A/D converters 23, 24 and 25 is converted to analog data in the retrace interval 50, and the data outputted from the Y memory 26, the R memory 27 and the B memory 28 is converted to analog data by the D/A converters 31, 32 and 33 to be outputted in the effective time for the picture images.

Thus, the data read from the Y memory 26, the R memory 27 and the B memory 28 and the blanking level data outputted from the A/D converters 23, 24 and 25 are converted to same formated picture signals or different formated picture signals. The synchronizing signal generated by the synchronizing signal generating circuit 34 is added to the luminance signal Y to obtain a picture signal (i.e., luminance signal Y+S, and color difference signals R−Y and B−Y). The picture signal thus formed is outputted to a magnetic disc or a display, etc. Consequently, no special circuit for producing blanking level data in the retrace interval is necessary, unlike prior art. This simplifies the circuitry of the image signal inputting and outputting apparatus.

The present invention can also be adapted to convert a signal format upon recording the picture signals such as NTSC, PAL-, or HDTV-TV signals in a still video apparatus for recording still picture images. Furthermore, the present invention can be applied to a video tape recorder or an optical disc apparatus in which moving picture images are recorded. To reproduce the picture images for one frame or indicate a still picture in a display, the picture images for one frame is read out from a video tape or the like and is indicated in the display, according to the present invention.

As can be understood from the above discussion, according to the present invention, to record or reproduce the picture image signals, or to convert the format of the picture image signals, or to reproduce one frame of the moving picture images as a still picture image, the inputted effective picture image signals are converted to digital data by the A/D converters and written in the semiconductor memory. The blanking level of signals in the retrace time subsequent to the last effective picture image signal is held in the A/D converter. And, the blanking level stored in the A/D converter is provided to the picture image signals upon reading out the picture image signals from the semiconductor memory. Consequently, not only can the circuitry be simplified, thus resulting in a realization of a compact data inputting and outputting apparatus, but also the semiconductor memory requires less capacitance for storage.

We claim:

1. An image signal inputting and outputting apparatus having memory means for temporarily storing image signals, comprising:

A/D converter means for converting analog image signals to digital image signals; and control means for writing said digital image signals into the memory means, reading out said digital image signals written in the memory means, and stopping a sampling clock so that said A/D converter means holds blanking level data converted by said A/D converter means after said A/D converter means converts effective signals of the image signals.

2. The image signal inputting and outputting apparatus of claim 1, said blanking level data being a pedestal level data.

3. The image signal inputting and outputting apparatus of claim 1, said control means stopping an A/D converting operation of said A/D converter means, after said blanking level data is held in said A/D converter means.

4. The image signal inputting and outputting apparatus of claim 1, said control means not enabling writing of a signal in a retrace interval in which said analog image signals are inputted into said A/D converter means.

5. The image signal inputting and outputting apparatus of claim 4, said control means stopping an A/D-converted-data output operation of said A/D converter means during a retrace interval in which said analog image signals are inputted.

6. The image signal inputting and outputting apparatus of claim 5, said control means writing said digital image signals outputted from said A/D converter means for one plane picture.

7. The image signal inputting and outputting apparatus of claim 6, said control means enabling said A/D converter means to execute only one converting operation of said blanking level data inputted after effective image signals of one plane picture.

8. The image signal inputting and outputting apparatus of claim 7, said control means outputting sampling clock signals to said A/D converter means, said A/D converter means performing converting operations in accordance with said sampling clock signals.

9. The image signal inputting and outputting apparatus of claim 8, said A/D converter means stopping A/D conversion while said sampling clock is stopped.

10. The image signal inputting and outputting apparatus of claim 9, said A/D converter means holding said blanking level data while said sampling clock is stopped.

11. The image signal inputting and outputting apparatus of claim 10, said control means outputting an enable signal to said A/D converter means, said A/D converter means outputting A/D conversion data while said enable signal is outputted by said control means.

12. The image signal inputting and outputting apparatus of claim 1, said control means reading said blanking level data held in said A/D converter means and adding said blanking level data to said digital image signals read out from the memory means to form a new image signal.

13. The image signal inputting and outputting apparatus of claim 1, further comprising D/A converter means for converting said digital image signals read out from the memory means and said blanking level data read out from said A/D converter means.

14. The image signal inputting and outputting apparatus of claim 13, said control means further comprising selecting means for selecting outputting means from said A/D converter means and the memory means.

15. The image signal inputting and outputting apparatus of claim 13, said control means selecting means to output said D/A converter based on an image signal format of monitor means.

16. The image signal inputting and outputting apparatus of claim 13, said control means forming new formatted picture signals by said digital image signal read from the memory means and said blanking level data outputted from said A/D converter means.

17. An image signal inputting and outputting apparatus having memory means for temporarily storing image signals which includes a luminance signal Y and color difference signals RY and B−Y, comprising:

A/D converter means for converting analog luminance signal Y and the color difference signals R−Y and B−Y to digital signals;

memory control means for writing said digital signals into the memory means and reading out the luminance signal Y and the color difference signals R−Y and B−Y written in the memory means; and control means for stopping a sampling clock, enabling a buffer memory of each A/D converter means to hold blanking level data converted by said A/D converter means after said A/D converter means converts effective signals of the luminance signal Y and the color difference signals R−Y and B−Y.

* * * * *

UNITED STATES PATENT AND TRADEMARK OFFICE
CERTIFICATE OF CORRECTION

PATENT NO. : 5,452,022
DATED : September 19, 1995
INVENTOR(S) : Y. YAMAMOTO et al.

It is certified that error appears in the above-indentified patent and that said Letters Patent is hereby corrected as shown below:

At column 8, line 34 (claim 17, line 34), change "RY" to ---R-Y---.

Signed and Sealed this

Eleventh Day of June, 1996

Attest:

BRUCE LEHMAN

*Attesting Officer*    *Commissioner of Patents and Trademarks*